Dec. 8, 1925.
E. F. McGARVEY ET AL
1,564,426
COVER FASTENER
Filed July 21, 1924
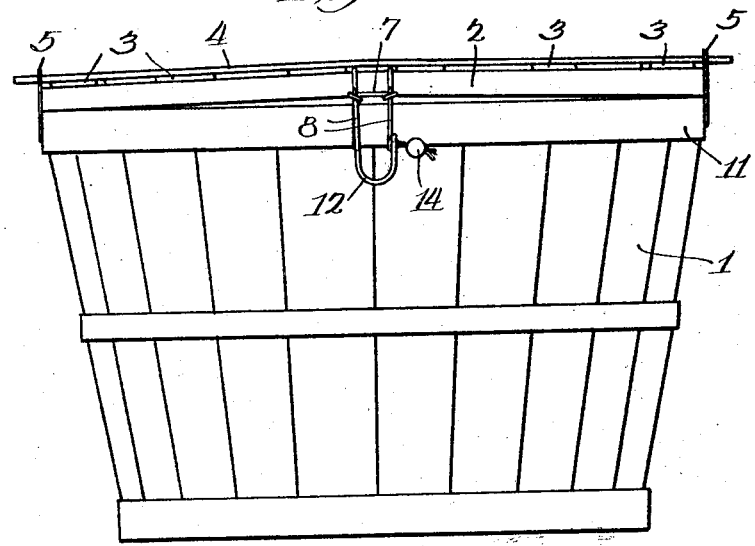
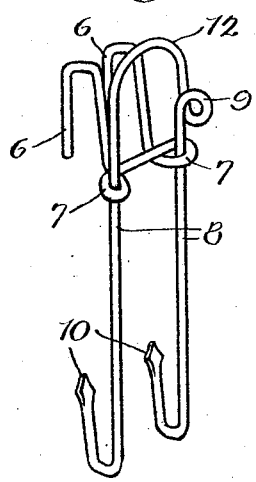
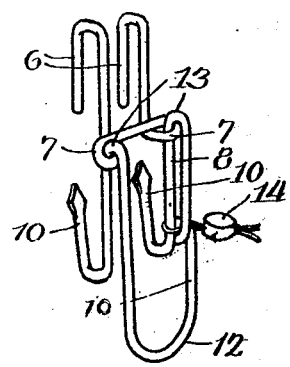
Inventors
Oliver Matthew James
Edward Francis McGarvey
By Arthur H. Durand
Atty Patented Dec. 8, 1925.

1,564,426

UNITED STATES PATENT OFFICE.

EDWARD FRANCIS McGARVEY AND OLIVER MATTHEW JAMES, OF DAYTON, TENNESSEE.

COVER FASTENER.

Application filed July 21, 1924. Serial No. 727,126.

*To all whom it may concern:*

Be it known that we, EDWARD FRANCIS MCGARVEY and OLIVER MATTHEW JAMES, citizens of the United States, and residents of Dayton, Rhea County, Tennessee, have invented a certain new and useful Improvement in Cover Fasteners, of which the following is a specification.

This invention relates to devices for fastening basket covers in place, and more particularly those for fastening covers on fruit baskets, such as bushel baskets or half bushel or other similar baskets.

Generally stated, the object of the invention is to provide a metal device which can be quickly applied to the cover, after the latter is placed in position in the ordinary manner, and whereby the cover can be secured very tightly on the full basket, thereby not only ensuring against loss of the contents by theft, or by falling out, but also against loosening of the cover, and tending to render the basket more satisfactory in appearance and more satisfactory for shipping purposes.

It is also an object to provide certain details and features of construction and combinations tending to increase the general efficiency and the desirability of a basket-cover fastening device of this particular character.

To the foregoing and other useful ends the invention consists in the matters hereinafter set forth and claimed, and shown in the accompanying drawings, in which,—

Fig. 1 is a side elevation of a basket provided with a cover fastening device embodying the principles of the invention.

Fig. 2 is a perspective of said device, before the same is bent into shape to fasten the cover down.

Fig. 3 is a perspective of said device, after a portion thereof is bent down to hold the cover in place.

As thus illustrated, the basket 1 may be of any suitable known or approved form or construction, such as an ordinary bushel or half bushel basket. In the shipping of fruit or other farm produce in a basket of this kind, it is desirable to have the basket full, so that the contents will not rattle around, and to close the basket a cover is employed, this cover comprising a hoop 2 upon which slats or strips 3 are secured in the ordinary manner, these slats being spaced apart to partially expose to view the contents of the basket. A long strip 4 of veneer or other similar material is secured to the top of the basket cover, and the ends of this strip are inserted under the bail-shaped handles 5 with which a basket of this kind is ordinarily provided. Ordinarily said handles 5 and the strip 4 constitute the only means for fastening a cover of this kind in place. The consequence is that the hoop 2 will bulge upwardly from the rim of the basket at opposite sides midway between the two handles, when the basket is full, as the contents will bulge the cover up at the center and also at the sides between the handles.

To remedy this difficulty, devices are applied to the cover at opposite sides midway between the two handles 5, so that these side portions of the cover are clamped down tight, or substantially so, against the rim or edge of the basket. Each fastening device when first applied is of the character shown in Fig. 2, comprising one member having hooks 6 for engaging the hoop of the cover, and having eyes 7 at the base. The other member of the device comprises two upright portions 8 which are slidable up and down in the eyes 7, and one of which portions 8 is provided with an eye 9 above one of the eyes 7, the two portions 8 having hooks 10 at their lower ends to grip the lower edge of the hoop 11 which forms the rim of the basket. In other words, the hook portions 6 are inserted downwardly inside of the hoop 2, and the hook portions 10 are inserted upwardly between the hoop 11 and the side walls of the basket. Then the upper portion 12 is pulled upwardly, while the cover is pressed downwardly, and when the cover is down as far as it will go at the side, the portion 12 is then forcibly bent over and downwardly, as shown in Fig. 3, thus forming loops 13 which hold the eyes 7 against upward displacement. A small wire is then inserted through the eye 9 and around the adjacent portion 8 of the wire device thus formed, and a seal 14 can then be applied to this small wire, thus forming a seal which must be broken before the portion 12 can be swung upward to straighten out the loops 13 and thereby release the cover.

As many of these devices can be applied to the basket as may be found desirable or necessary, but ordinarily two of these devices, at opposite sides about midway between the handles 5, will be found sufficient. These devices are made of wire of suitable stiffness and strength, so that they will securely hold the cover and so that the wire can be bent to form the loops 13 in the manner shown and described, thus locking the cover in its depressed position at each side thereof.

Thus the baskets can be filled so full that they will bulge the covers upwardly, in the manner required or desired, ordinarily, while at the same time the cover will not be sprung away from the rim of the basket at opposite sides between the handles of the basket, as is ordinarily the case when only the strip 4 is employed to secure the cover in place. The basket thus loaded and closed is more satisfactory to handle and is more satisfactory for shipping purposes, as the contents are not liable to fall out, and at the same time the contents are guarded against theft, to a large extent, for with the baskets closed in this manner they cannot be opened easily. If the devices are tampered with, or if the seals are broken, it will be obvious that the baskets have been opened by unauthorized persons.

The contents are held solidly and firmly in place within the basket, and the cover is not liable to be displaced or accidentally removed during handling or shipment of the baskets. At the same time, and while the fastening devices are made of wire, they are so formed that there is nothing about them which will injure the hands of the freight handlers. They are easily applied and easily removed, and in addition these auxiliary fastening devices are comparatively inexpensive to manufacture.

Each fastening device, therefore, comprises only two members, one wire member providing the upper pair of hooks 6, and the other member providing the lower pair of hooks 10, and the upper member being provided with the eyes 7 to provide the slidable connection between the two pairs of hooks.

It will be seen that any suitable or desired number of devices, such as the one shown in Fig. 2, can be applied to the basket, at different sides thereof. These devices are entirely independent of each other, as the device at one side is in no way connected to the device at the other side of the basket, and hence the different devices can be spaced any desired distance apart, and any desired number of these devices can be employed. With the fastening devices thus made entirely of wire, they are simple and easily attached, and comparatively inexpensive to manufacture and are applicable to any size of basket.

What we claim as our invention is:

1. A basket and cover therefor, handles for the basket, means for engaging said handles to hold the cover down, and securing devices applied to the outer edges of the cover and the rim of the basket at opposite sides between the two handles, said devices being separately attachable to the basket and cover, so that the device at one side is independent of the device at the other side, so that said devices are applicable to baskets of different sizes, comprising means which are adjustable to the cover when upwardly bulged or separated from the rim of the basket, adapted to permit forcible depression of the two sides of the cover after said devices are applied thereto, and adapted to be bent into shape to hold the cover in its forcibly depressed position at opposite sides thereof.

2. A basket and cover therefor, handles for the basket, means for engaging said handles to hold the cover down, and securing devices applied to the outer edges of the cover and the rim of the basket at opposite sides between the two handles, said devices comprising a wire member providing a pair of hooks for application to the cover, another pair of hooks for application to the rim of the basket, the two pairs of hooks being adjustable toward and away from each other, and means adapted to be bent into position to hold the two pairs of hooks against movement away from each other after the cover is pressed down.

3. A fastening device comprising an upper pair of hooks, a lower pair of hooks, the two pairs of hooks being intended to grip portions which are movable toward each other, slidable connection between the two pairs of hooks, so that one pair may move toward the other when said two portions are moved toward each other, and an element which is bendable into shape to prevent the two pairs of hooks from moving away from each other after said two portions are moved toward each other the desired and necessary distance.

4. A structure as specified in claim 3, said slidable connection comprising parallel portions, and a pair of eyes slidable on said parallel portions.

5. A structure as specified in claim 3, said entire fastening device being made of wire, and there being two members, one wire member providing one pair of hooks, and the other wire member providing the other pair of hooks, and one member forming said bendable element for the purpose stated.

6. A structure as specified in claim 3, in combination with a seal applied to said device, after being bent in the manner stated, thereby to seal the device against separating movement of the two pairs of hooks.

7. In combination with a basket, a cover therefor, a fastening device to hold the edge of the cover down, attachable independently to the cover at one side of the basket, so that one or more such devices can be fastened to different sides of the basket and cover independently of each other, so that said device is applicable to baskets of different sizes, said device being bendable after application to the basket and cover, and a seal applied to said device to hold the latter in bent condition.

8. In combination with a basket, a cover therefor, and a fastening device to engage the cover and the rim of the basket, said fastening device comprising an upper pair of hooks to engage the cover, a lower pair of hooks to engage the rim of the basket, slidable connection between the two pairs of hooks whereby the edge portion of the cover may be pressed down in place, and said device having a bendable portion adapted to be bent into shape to hold the cover down.

9. A structure as specified in claim 8, said fastening device being made entirely of wire, and comprising only two members, one member providing one pair of hooks and the other wire member providing the other pair of hooks.

10. A structure as specified in claim 8, said device being made entirely of wire and comprising only two members, one member providing one pair of hooks, and the other member providing the other pair of hooks, one member being bent to provide eyes, and the other member having parallel straight portions slidable in said eyes, whereby the two pairs of hooks are movable toward each other when the cover is pressed down, and one member being bendable to provide loops engaging said eyes to hold the cover down.

11. In combination with a basket, a cover therefor, ordinary means for holding the cover in place, and auxiliary devices applied at opposite sides to hold the edges of the cover down, said auxiliary devices being removable to permit opening of the cover.

12. A structure as specified in claim 11, each device being constructed entirely of wire, and comprising only two members, one member providing a pair of hooks to engage the cover, and the other member providing a lower pair of hooks to engage the rim of the basket, the two members being slidably connected.

EDWARD FRANCIS McGARVEY.
OLIVER MATTHEW JAMES.